United States Patent
Stefans et al.

(10) Patent No.: US 11,575,858 B2
(45) Date of Patent: Feb. 7, 2023

(54) VIDEO DEVICE WITH ELECTROMAGNETICALLY REFLECTIVE ELEMENTS

(71) Applicant: Comcast Cable Communications, LLC, Philadelphia, PA (US)

(72) Inventors: Erik Stefans, Philadelphia, PA (US); Michael Rekstad, Philadelphia, PA (US); Henry Homza, Philadelphia, PA (US); Abraham Thomas, Philadelphia, PA (US); Michael Jou, Philadelphia, PA (US); Kenneth Egan, Philadelphia, PA (US); David Urban, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 70 days.

(21) Appl. No.: 17/187,130

(22) Filed: Feb. 26, 2021

(65) Prior Publication Data

US 2022/0279148 A1    Sep. 1, 2022

(51) Int. Cl.
  *H04N 7/18* (2006.01)
  *G08B 13/196* (2006.01)

(52) U.S. Cl.
  CPC ......... *H04N 7/186* (2013.01); *G08B 13/1966* (2013.01); *G08B 13/19619* (2013.01); *G08B 13/19626* (2013.01)

(58) Field of Classification Search
  CPC .............. H04N 7/186; G08B 13/19619; G08B 13/19626; G08B 13/1966
  See application file for complete search history.

(56) References Cited

U.S. PATENT DOCUMENTS

| | | |
|---|---|---|
| D787,359 S | 5/2017 | Scalisi |
| D795,940 S | 8/2017 | Huang |
| D813,700 S | 3/2018 | Scalisi |
| D817,207 S | 5/2018 | Scalisi |
| D828,201 S | 9/2018 | Jeong |
| D842,156 S | 3/2019 | Hanna |
| D859,200 S | 9/2019 | Siminoff |
| 11,336,005 B1* | 5/2022 | Chen ..................... H04N 7/186 |
| 2015/0022618 A1* | 1/2015 | Siminoff ............ H04N 21/4424 348/14.02 |
| 2016/0125713 A1* | 5/2016 | Blech ................... G08B 13/187 348/143 |
| 2016/0286169 A1* | 9/2016 | Sannala ................ G08B 25/10 |
| 2019/0327448 A1* | 10/2019 | Fu ............................ G08B 3/10 |
| 2022/0124226 A1* | 4/2022 | Jeong ....................... G08B 3/10 |

* cited by examiner

*Primary Examiner* — Jared Walker
(74) *Attorney, Agent, or Firm* — Ballard Spahr LLP

(57) ABSTRACT

An apparatus, such as a doorbell, may include a doorbell housing. The doorbell housing may include a front surface facing exterior of a premises and a rear surface facing interior of the premises. A camera, doorbell activator, motion sensor, and/or light source may be at least partially positioned within the doorbell housing. An antenna may be positioned within the doorbell housing. The antenna may be configured to send a wireless signal comprising data to a data receiving device inside the premises. A reflective member may be positioned within the doorbell housing and configured to reflect at least a portion of the wireless signal that is sent toward the front surface of the doorbell housing.

21 Claims, 11 Drawing Sheets

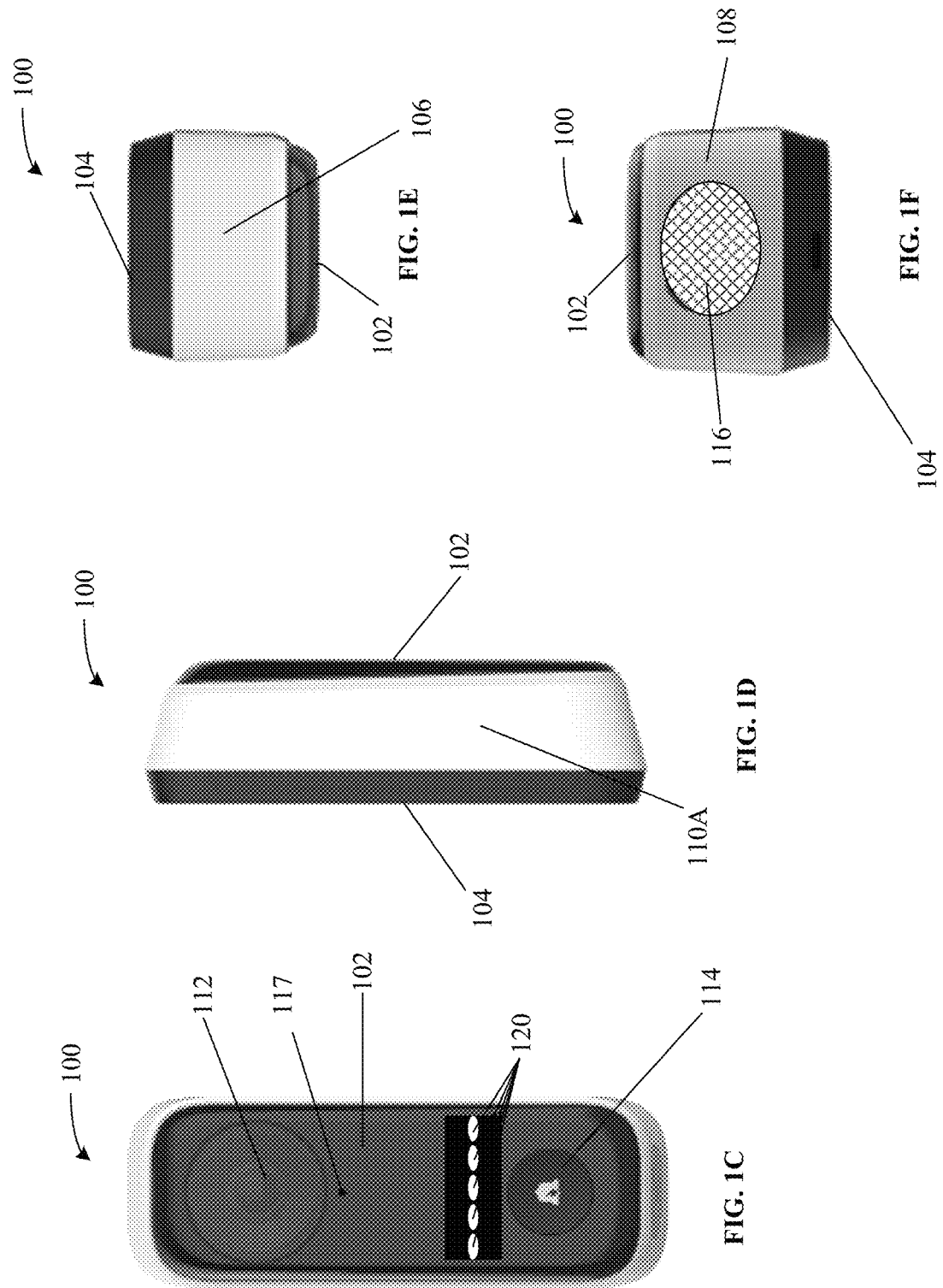

VIDEO DEVICE WITH ELECTROMAGNETICALLY REFLECTIVE ELEMENTS

BACKGROUND

Video doorbells and video cameras have become an increasing feature for home security. Conventional video doorbells and cameras can wirelessly transmit video and/or audio content from an environment adjacent to the video doorbell or camera to a user device (e.g., an access point, a mobile device, laptop computer, or desktop computer) and/or a storage device. For example, the video doorbell or camera can be disposed exterior of a premises, and include an antenna configured to transmit radio frequency (RF) signals containing the video and/or audio content to the user device and/or storage device that is internal to the premises. The antenna may transmit the RF signals out in a number of directions from the device. The result is that only a small portion of the RF signals being transmitted by the antenna are able to be received by the user device, such as an access point. These and other shortcomings are identified and addressed by the disclosure.

SUMMARY

It is to be understood that both the following general description and the following detailed description are exemplary and explanatory only and are not restrictive. A video device configured to directionally reflect at least a portion of the radio frequency signals generated by the device is described. The apparatus may include a housing. The housing may include one or more walls. For example, the housing may include front wall, a rear wall, a top wall, a bottom wall, and one or more side walls. A number of components may be provided along the front wall of the housing. For example, a camera, a doorbell activator, a motion sensor, and/or a light source may be provided along the front wall of the housing.

The front wall, rear wall, top wall, bottom wall, and one or more side walls may define a cavity within the housing. One or more circuit boards may be positioned within the cavity of the housing. The camera, a doorbell activator, a motion sensor, and/or a light source may be communicably coupled to at least one of the one or more circuit boards. An antenna may be communicably coupled to at least one of the one or more circuit boards and positioned within the cavity of the housing.

A reflective member (e.g., an electromagnetically reflective member) may be positioned within the cavity of the housing. The reflective member may be sized and shaped to redirect at least a portion of the wireless signals (e.g., radio frequency signals) sent by the antenna, and initially directed exterior of the premises, towards an interior of a premises. For example, the reflective member may have any shape, including, but not limited to, U-shaped, substantially U-shaped, or another functionally suitable shape. The reflective member may include a material or coating suitable for reflecting at least a portion of the radio frequency signals sent by the antenna in a direction different from signal's original direction. For example, the reflective member may reflect at least a portion of the radio frequency signals originally heading away from, or out from an exterior of a premises (e.g., a house, building, townhouse, condo, apartment, or another structure) in a direction back towards the interior of the premises. For example, at least a portion of the reflective member may be positioned between the antenna and the area outside of the premises to reflect radio frequency signals back towards the interior of the premises. For example, at least a portion of the reflective member may be positioned between the antenna and the front wall of the housing to reflect at least a portion of the radio frequency signals originally sent by the antenna towards the front wall of the housing, back towards the back wall of the housing and towards the interior of the premises. The reflective member may include a first free end and a second free end. The first free end may be positioned between the antenna and a first side of the housing and the second free end may be positioned between the antenna and a second side of the housing.

The device may include a trim plate. The trim plate may reflect at least another portion of the wireless signals (e.g., radio frequency signals) sent by the antenna towards the interior of the premises. For example, at least a portion of the trim plate may be positioned to reflect at least a portion of the radio frequency signals sent by the antenna towards the back wall of the housing and towards the interior of the premises. The trim plate may be coupled to the housing. The trim plate may include an outer surface and an inner surface. All or at least a portion of the inner surface of the trim plate may include an electromagnetically reflective inner surface. The trim plate may surround at least a portion of the housing. For example, the trim plate may surround at least a portion of the top wall, bottom wall, and one or more side walls of the housing.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 1C shows a front elevation view of the example video doorbell device;

FIG. 1D shows a side elevation view of the example video doorbell device;

FIG. 1E shows a top plan view of the example video doorbell device;

FIG. 1F shows a bottom plan view of the example video doorbell device;

DETAILED DESCRIPTION

Figure 1A:
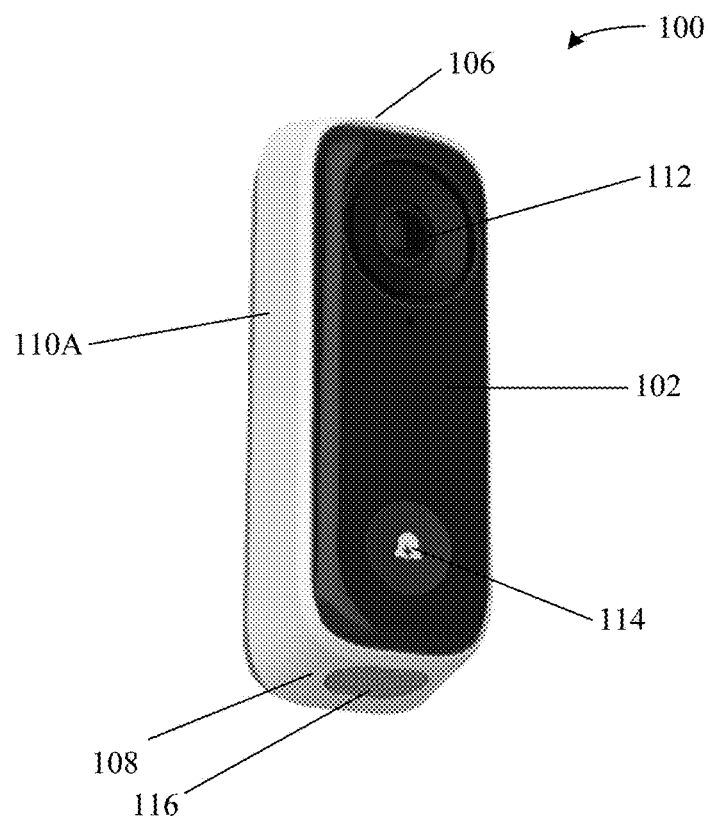
FIG. 1A shows a front perspective view of an example video doorbell device.
Figure 1B:
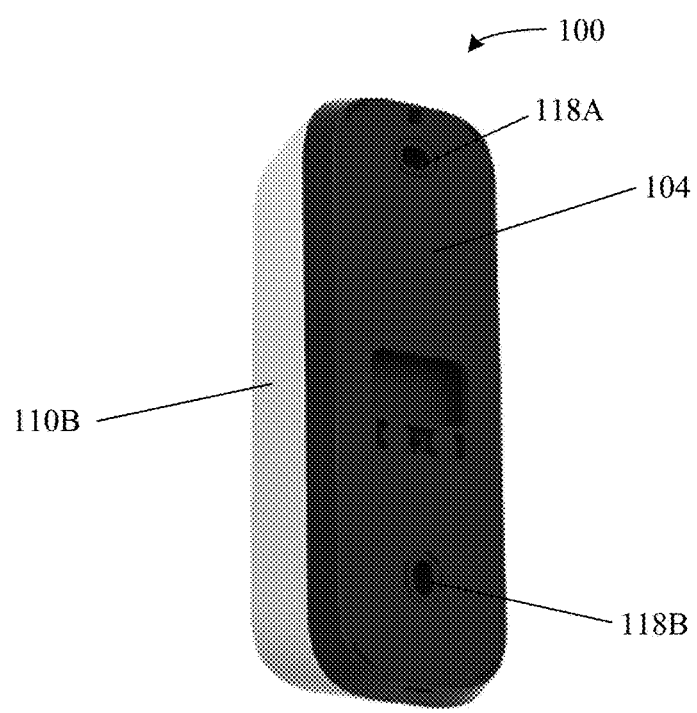
FIG. 1B shows a rear perspective view of the example video doorbell device.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described element, feature, event, or circumstance may or may not be included or occur, and that the description includes cases where said element, feature, event, or circumstance is included or occurs and cases where it is not included or does not occur.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

Certain relationships between dimensions of the device described herein and between features of the device are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially vertical" indicates that the vertical relationship of the element is not a strict limitation and does not exclude functionally similar variations therefrom. As used herein, the term "substantially horizontal" indicates that the horizontal relationship of the element is not a strict limitation and does not exclude functionally similar variations therefrom. As used herein, the term "substantially parallel" indicates that the parallel relationship is not a strict relationship and does not exclude functionally similar variations therefrom. As used herein the term "substantially level" indicates that the positional relationship is not a strict relationship and does not exclude functionally similar variations therefrom.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, elements and features in described apparatuses and steps in described methods. Thus, if there are a variety of additional steps that may be performed or elements and features that may be included or substituted, it is understood that each of these additional steps may be performed or elements and features may be included or substituted with any specific configuration or combination of configurations of the described methods, systems, and apparatuses.

Throughout this application reference is made to block diagrams. It will be understood that each block of the block diagrams, and combinations of blocks in the block diagrams, respectively, may be implemented in a number of different ways. Accordingly, blocks of the block diagrams support one or a combinations of devices for performing the specified functions.

Certain video doorbell devices and video camera devices include an antenna for wirelessly sending video and/or audio content recorded by the device. The antenna can generate an electromagnetic wave of RF signals (e.g., Wi-Fi, Bluetooth, Zigbee, or another wireless standard) that include the video and/or audio content to be received by another RF-enabled device, such as an access point. In order to increase the amount of the electromagnetic wave directed towards the other RF-enabled device, the video doorbell devices and video camera devices can include one or more electromagnetically reflective members. The electromagnetically reflective members can be positioned between the antenna and another part of the device or the environment in one or more directions that the RF signals do not need to be sent (e.g., opposite the direction of the other RF-enabled device).

Accordingly, a video doorbell or camera device for providing data, such as video and/or audio content of an environment near a premises (e.g., house, building, townhouse, condo, apartment, or another structure) is shown and described. The device may include a housing that includes one or more walls. For example, the housing may include a front wall, a rear wall, a top wall, a bottom wall, and one or more side walls that together define a cavity within the housing. The front wall may be configured to face out or away from the premises (e.g., a house, building, townhouse, condo, apartment, or another structure). The rear wall may be configured to face towards the interior of the premises (e.g., a house, building, townhouse, condo, apartment, or another structure).

A number of components may be positioned along the front wall of the housing. For example, a camera, doorbell activator, motion detector, and/or a light source may be positioned along the front wall of the housing. These components may be positioned within the cavity of the housing and/or along the outer surface of the front wall of the housing.

The cavity may include a number of components for operating the device. For example, one or more circuit boards may be positioned within the cavity. The camera, doorbell activator, motion detector, and/or light source may be communicably coupled to one or more of the one or more circuit boards. For example, an antenna, transmitter, receiver, and/or transceiver may be positioned within the cavity. Each of the antenna, transmitter, receiver, and/or transceiver may be communicably coupled to one or more of the circuit boards. The antenna may be configured to send and receive electromagnetic waves in multiple directions. For example, the antenna may be configured to send and receive radio frequency (RF) signals.

For example, a member may be positioned within the cavity. The member may be an electromagnetically reflective member or may have a surface or coating that is electromagnetically reflective. The member may be positioned between the antenna and the front wall of the housing. The member may be configured to reflect RF signals sent or output by the antenna in a direction towards the back wall of the housing and/or towards the premises (e.g., house, building, townhouse, condo, apartment, or another structure).

The member may include a top edge at a first vertical positon in the housing and a bottom edge at a second vertical position in the housing. All or at least a portion of the antenna may be positioned within the cavity of the housing between the first vertical position and the second vertical position. The member may include a first free end and a second free end. The antenna may be positioned between the first free end and the second free end. For example, the first free end may be positioned between the antenna and a first side wall of the housing and the second free end may be positioned between the antenna and a second side wall of the housing. The member may surround the antenna along three sides of the antenna.

The member may have any shape. For example, the member may be U-shaped or substantially U-shaped. For example, the member may be a continuous curve. For example, the member may include multiple portions. For example, the member may include a first portion, a second portion, and a third portion. Each of the first portion, the second portion, and the third portion may include a planar or curved inner surface. The second portion and the third portion of the member may extend from the first portion at an angle. For example, the angle may be a right angle or an orthogonal angle.

The device may include a trim plate. The trim plate may be coupled to the housing. The trim plate may surround at least a portion of the housing. For example, the trim plate may surround the top wall, bottom wall, and one or more side walls of the housing. The trim plate may include an outer surface and an inner surface. The inner surface may abut or be positioned facing the housing. The trim plate may be an electromagnetically reflective trim plate or may have a surface or coating that is electromagnetically reflective. For example, the inner surface of the trim plate may be electromagnetically reflective. The trim plate may be configured to reflect RF signals sent or output by the antenna in a direction towards the back wall of the housing and/or towards the premises (e.g., house, building, townhouse, condo, apartment, or another structure). For example, the inner surface of the walls of the trim plate may be angled to reflect the RF signals in the direction towards the back wall of the housing and/or towards the premises.

FIGS. 1A-F show various views of an example device 100 that may be configured to be fixedly or removably coupled to a premises (e.g., a house, a condominium, an apartment, a duplex, a townhouse, an office building, another building, another structure, a post, a fence, a gate, a tree, or another mountable surface) either directly or indirectly with the use of additional components. For example, the device 100 may be configured to be fixedly or removably coupled to a mountable surface adjacent to a doorway or other egress point of a premises (e.g., house, building, townhouse, condo, apartment, or another structure). For example, the device 100 may be configured to be fixedly or removably coupled to a mountable surface along any other portion of the premises. The mountable surface may be a wall, a door, a doorjamb, a ceiling, an awning a fascia, a post, a column, a fence board or panel, a portion of a tree, or any other mountable surface, The device 100 may be one or more of a wireless doorbell, wired doorbell, wireless video camera, wired video camera, wireless speaker and microphone, or wired speaker and microphone.

The device 100 may be constructed of one or more pieces. The device 100 may include a front surface 102, a rear surface 104, a top surface 106, a bottom surface 108, and one or more side surfaces 110A-B. Each of the front surface 102, the rear surface 104, the top surface 106, the bottom surface 108, and the one or more side surfaces 110A-B may be on the same or different pieces of the device 100. For example, the rear surface 104 may be part of one piece of the device 100 and the front surface 102 may be part of a second piece of the device 100. At least a portion of the front surface 102 and the rear surface 104 may be planar or substantially planar. For example, a majority of the rear surface 104 may be planar or substantially planar. For example, the rear surface 104 may be configured to abut a mountable surface for fixedly or removably coupling the device 100 to the mountable surface.

The device 100 may include a number of components along the one or more surfaces 102-110B of the device 100. An example for the position of some of these components will be described hereinafter; however, it is understood that any of the described components may be positioned along any of the other surface 102-110B of the device 100 in other example embodiments. For example, the device 100 may include a camera 112. The camera 112 may be communicably coupled to one or more circuit boards 308, as discussed below with regard to FIGS. 3A-B. The camera 112 may, for example, be positioned along the front surface 102 of the device 100. For example, the camera 112 may be a video camera configured to capture a video feed of events occurring in front of the front surface 102 of the device 100. For example, the camera 112 may be a still camera configured to capture still images of events occurring in front of the front surface 102 of the device 100. For example, the camera 112 may be optionally excluded from the device 100.

The device 100 may include a doorbell activator 114. The doorbell activator 114 may be communicably coupled to one or more circuit boards 308, as discussed below with regard to FIGS. 3A-B. The doorbell activator 114 may, for example, be positioned along the front surface 102 of the device 100. For example, the doorbell activator 114 may be positioned vertically below the camera 112 along the front surface 102 of the device 100. For example, the doorbell activator 114 may be positioned along any other surface 104-110B of the device 100. The doorbell activator 114 may be a manually-activated or motion-activated switch. For example, a manually-activated doorbell activator 114 may include a push-button-switch, a capacitive switch, a toggle-switch, or a pull-switch. For example, the doorbell activator 114 may be optionally excluded from the device 100.

The device 100 may include a speaker and/or a microphone 116. Each of the speaker and the microphone 116 may be communicably coupled to one or more circuit boards 308, as discussed below with regard to FIGS. 3A-B. The speaker and the microphone may be positioned together on the device 100. For example, the speaker/microphone combination 116 may be positioned along the bottom surface 108 of the device 100 vertically below the camera 112 and/or the doorbell activator 114. For example, the speaker/microphone combination 116 may be positioned along any other surface 104-110B of the device 100. The speaker and microphone 116 may be positioned separate from one another on the device 100. For example, the speaker may be positioned along one surface 102-110B and the microphone may be positioned along another surface 102-110B of the device 100. For example, the speaker and microphone may be positioned along the same surface 102-110B of the device but at two separate locations. The speaker 116 may be configured to generate audible sound to the area adjacent the device 100. The microphone 116 may be configured to receive audible sound from the area adjacent to the device 100.

The device 100 may include a motion sensor (not shown). The motion sensor may be communicably coupled to one or more circuit boards 308, as discussed below with regard to FIGS. 3A-B. The motion sensor may, for example, be positioned along the front surface 102 of the device 100. The motion sensor may be any type of motion sensor. For example, the motion sensor may be passive infrared motion sensor, a microwave sensor, a combination microwave and passive infrared sensor, or any other type of motion sensor known to those skilled in the art. For example, the motion sensor may be optionally excluded and the camera 112, via the one or more circuit boards 308, may include advanced signal processing to detect motion and determine when to start recording at the camera 112 and/or the microphone 116.

The device 100 may include one or more apertures 118A-B that extend through all or a portion of the device 100. For example, the one or more apertures 118A-B may be positioned along a rear surface 104 of the device 100. The one or more apertures 118A-B may each be configured to receive a coupling device (not shown) (e.g., a screw, a nail, a rivet, a pin) therethrough for removably or fixedly coupling the device to a mountable surface. For example, two apertures 118A-B may be provided along the rear surface 104 of the device. For example, one or more than two apertures 118A-B may be provided along the rear surface 104 or another surface 102-110B of the device 100.

The device 100 may include one or more light sources 120. Each of the one or more light sources 120 may be communicably coupled to one or more circuit boards 308, as discussed below with regard to FIGS. 3A-B. The one or more light sources 120, for example, may be positioned along the front surface 102 of the device 100. For example, the one or more light sources 120 may be positioned vertically below the camera 112 along or adjacent the front surface 102 of the device 100. For example, the one or more light sources 120 may be positioned vertically above the camera 112 along or adjacent the front surface 102 of the device 100. For example, the one or more light sources 120 may be positioned vertically above the doorbell activator 114 along or adjacent the front surface 102 of the device 100. For example, the one or more light sources 120 may be positioned vertically below the doorbell activator 114 along or adjacent the front surface 102 of the device. For example, the one or more light sources 120 may be positioned vertically between the camera 112 and the doorbell activator 114 along or adjacent the front surface 102 of the device. For example, the one or more light sources 120 may be positioned along or adjacent any other surface 104-110B of the device 100. Each of the one or more light sources 120 may be any type of light source including, but not limited to, a light emitting diode (LED), organic LED, incandescent, etc.). For example, five LED light sources 120 may be provided along or adjacent the front surface 102 of the device 100. For example, the five light sources 120 may be aligned horizontally along or adjacent the front surface 102 of the device 100. For example, each of the one or more light sources 120 may be positioned behind the front surface 102 and may generate light that is emitted through the front surface 102. For example, the front surface 102 may include at least a portion that is transparent or translucent along at least the location of the one or more light sources 120 so that light emitted by each of the one or more light sources 120 is viewable from an exterior area of the device 100. The one or more light sources 120 may provide a visual indication of audible sound being emitted by the speaker 116. For example, as the volume of audio emitted by the speaker 116 increases, the number of the one or more light sources 120 that are energized to emit visual light increases.

FIGS. 2A-D show various views of the device 100. As discussed above with reference to FIGS. 1A-F, the device 100 may be constructed of more than one piece. For example, the device 100 may include a housing 202. The device 100 may also include a mounting plate 204 that is coupled to the housing 202. For example, the mounting plate 204 may be removably or fixedly coupled to the housing 202. The device 100 may include a trim plate 206. The trim plate 206 may be removably coupled to the housing 202 and configured to surround at least a portion of an outer surface of the housing 202.

The housing 202 may include a front wall 208, an opposing rear wall 210 and one or more additional walls positioned between the front wall 208 and the rear wall 210. For example, the housing may include a top wall 212, a bottom wall 214, and one or more side walls 216, each extending from the front wall 208 to the rear wall 210. For example, a single wall may be positioned between and extend from the front wall 208 to the rear wall 210.

The camera 112, the doorbell activator 114, the motion sensor, and the one or more light sources 120 may, for example, be positioned along or adjacent the front wall 208 of the housing 202 in a manner the same as that described with regard to the front surface 102 of the device 100 of FIGS. 1A-F. For example, the camera 112, the doorbell activator 114, the motion sensor, and the one or more light sources 120 may be positioned along or adjacent any other wall 210-216 of the housing 202. The speaker and/or microphone 116 may, for example, be positioned along or adjacent the bottom wall 214 of the housing 202 in a manner same as that described with regard to the bottom surface 108 of the device 100 of FIGS. 1A-F. For example, the speaker and/or microphone 116 may be positioned along or adjacent any other wall 208-216 of the housing 202. The device 100 may include one or more electrical contacts (not shown) positioned along the rear wall 210 of the housing 210. For example, the one or more electrical contacts may be electrically coupled to and provide electrical power to the one or more circuit boards 308 of FIGS. 3A-B, the camera 112, the doorbell activator 114, the speaker and/or microphone 116, the motion sensor, and the one or more light sources 120, as well as other components of the device 100. The one or more electrical contacts may be directly or indirectly electrically coupled to a power source. The power source may be a battery or mains power provided through one or more conductive wires.

The mounting plate 204 may include a front surface 218, an opposing rear surface 220, a top end 222, a bottom end 224, and one or more side surfaces 226A-B. For example, the front surface 218 of the mounting plate 204 may abut or be positioned adjacent to the rear wall 210 of the housing 202 when the housing 202 is coupled to the mounting plate 204. The rear surface 220 of the mounting plate may abut or be positioned adjacent to a mountable surface when the mounting plate 204 is coupled to the mountable surface.

The mounting plate 204 may include the one or more apertures 118A-B for coupling the mounting plate 204 to a mountable surface. For example, the apertures 118A-B may include two apertures 118A-B that are vertically or substantially vertically aligned along and extend through the front surface 218 and the rear surface 220. For example, the mounting plate 204 may include more or less than two apertures. 118A-B.

The mounting plate 204 may include one or more electrical contacts 228A-B positioned along the front surface 218 of the mounting plate 204. For example, the one or more electrical contacts 228A-B may be electrically coupled to the one or more contacts of the housing 202 and provide electrical power to the one or more circuit boards 308 of FIGS. 3A-B, the camera 112, the doorbell activator 114, the speaker and/or microphone 116, the motion sensor, and the one or more light sources 120, as well as other components of the device 100. The one or more electrical contacts 228A-B may be directly or indirectly electrically coupled to a power source. The power source may be a battery or mains power provided through one or more conductive wires.

The mounting plate 204 may include a coupling device 230. For example, the coupling device 230 may be a threaded coupling device for removably coupling the housing 202 to the mounting plate 204. For example, the coupling device 230 may be a pin, a rivet, a bolt or any other type of coupling device for coupling the housing 202 to the mounting plate 204. The coupling device 230 may be positioned along the top end 222 or any other surface of the mounting plate 204. For example, the housing 202 may include a threaded aperture along the top wall 212 and the mounting plate 203 may include a through-hole or threaded aperture along the top end 222 of the mounting plate such that the coupling device 230 may threadably couple the housing 202 to the mounting plate 204. The housing 202 may be coupled to the mounting plate 204 in any other known manner such as press fit, snap fit, threadable coupling, nail, rivet, pin, adhesive, etc.

The mounting plate 204 may include a wire aperture 233. The wire aperture 233 may extend through the front surface 218 and the rear surface 220. For example, the wire aperture 233 may be sized and shaped to receive one or more wires therethrough for electrically coupling the device 100 to a power source, such as mains power or battery-supplied power. In certain examples, the mounting plate 204 may be optionally excluded and the housing 202 may be directly coupled to a mountable surface. For example, the housing 202 may include the apertures 118A-B, such as along the top wall 212 and the bottom wall 214 and/or along the one or more side walls 216 for coupling the housing 202 to the mountable surface.

The trim plate 206 may include a front edge 232 and a rear edge 234. The trim plate 206 may include one or more walls that extend from the front edge 232 to the rear edge 234. For example, the trim plate may include a top wall 236, a bottom wall 238, and one or more side walls 240A-B. For example, the trim plate 206 may include a first side wall 240A and a second side wall 240B. The trim plate 206 may include more than two side walls 240A-B in other examples. Each of the top wall 236, bottom wall 238, and one or more side walls 240A-B may include an outer surface 241 and an inner surface 242. The inner surface 242 may be constructed of or include an electromagnetically reflective material or have an electromagnetically reflective coating. For example, the inner surface 242 may be configured to reflect radio frequency (RF) signals that impact the inner surface 242. For example, the inner surface 242 may constructed of or otherwise include ceramic, glass, metal or may include an electromagnetically reflective coating, such as a coating of metal, ceramic, or glass.

The top wall 236, bottom wall 238, and one or more side walls 240A-B may define an aperture 244. The aperture 244 may extend through the trim plate 206 from the front edge 232 to the rear edge 234. The aperture 244 may be sized and shaped to receive a portion of the housing 202 therethrough. For example, when the trim plate 206 is coupled to the housing 202, the top wall 236 may abut or be positioned adjacent to the top wall 212 of the housing 202, the bottom wall 238 may abut or be positioned adjacent to the bottom wall 214 of the housing 202, the first side wall 240A may abut or be positioned adjacent to a side wall 216 of the housing 202, and the second side wall 240B may abut or be positioned adjacent to another side wall 216 of the housing 202.

The bottom wall 238 may include an aperture 246 that extends through the bottom wall 238. The aperture 246 may be sized and shaped to receive a portion of the speaker 116 therethrough or to provide an opening adjacent to the speaker 116 to prevent distortion.

Figure 2A:
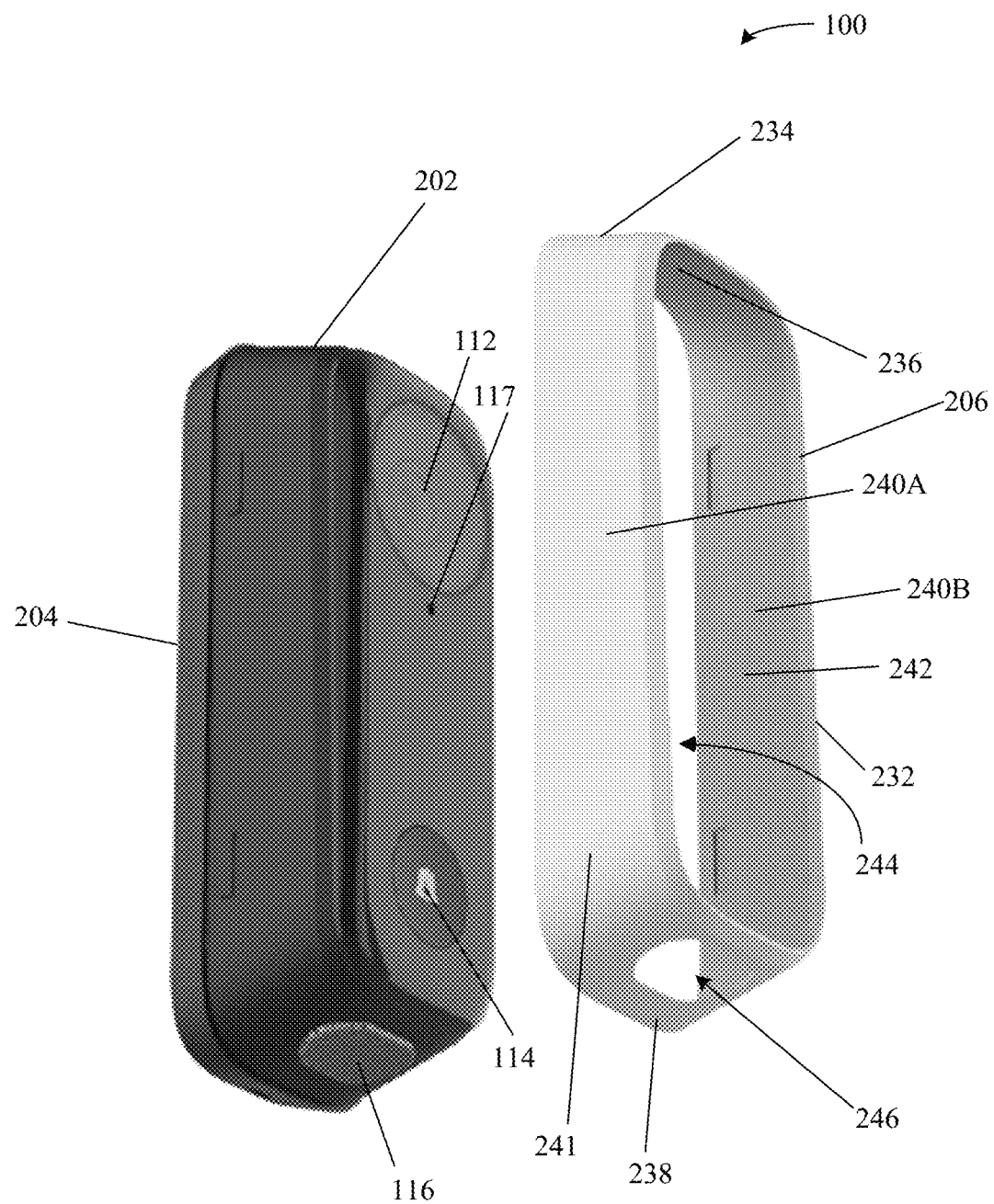
FIG. 2A shows a partial-exploded vice of the example video doorbell device.
Figure 2B:
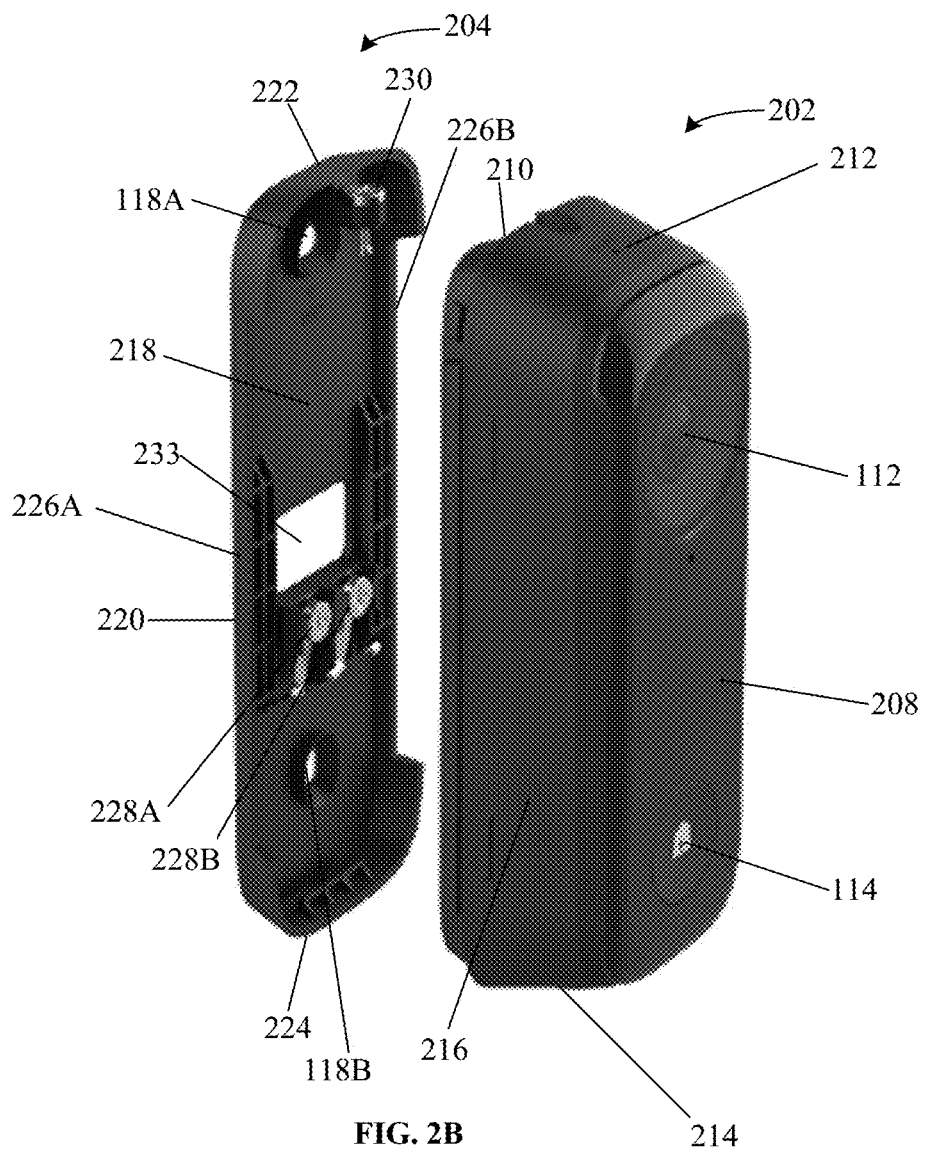
FIG. 2B shows another partial-exploded view of the example video doorbell device.
Figure 2C:
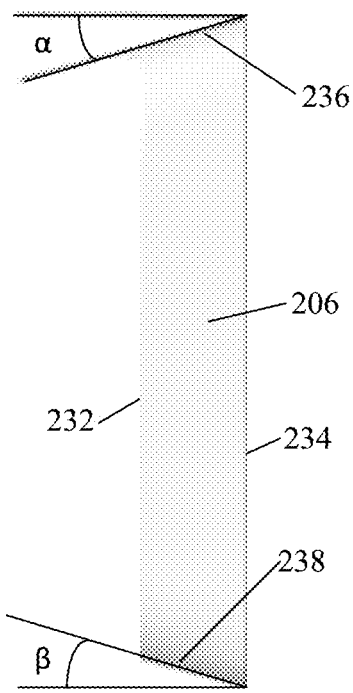
FIG. 2C shows a side elevation view of a trim plate of the example video doorbell device.

The top wall 236 of the trim plate 206, and thus the corresponding inner surface 242 of the top wall 236, may extend downwardly at an angle from the horizontal from or adjacent the rear edge 234 to or adjacent the front edge 232. For example, as shown in FIG. 2C, the top wall 236 may extend downward from or adjacent the rear edge 234 to or adjacent the front edge 232 at an angle $\alpha$ to the horizontal. For example, the angle $\alpha$ can be an acute angle. For example, the angle $\alpha$ can be in the range of substantially 5 degrees to substantially 45 degrees. For example the angle $\alpha$ can be substantially 15 degrees.

The bottom wall 238 of the trim plate 206, and thus the corresponding inner surface 242 of the bottom wall 238, may extend upwardly at an angle from the horizontal from or adjacent the rear edge 234 to or adjacent the front edge 232. For example, as shown in FIG. 2C, the bottom wall 238 may extend upward from or adjacent the rear edge 234 to or adjacent the front edge 232 at an angle $\beta$ to the horizontal. For example, the angle $\beta$ can be an acute angle. For example, the angle $\beta$ can be in the range of substantially 5 degrees to substantially 45 degrees. For example the angle $\beta$ can be substantially 15 degrees.

Figure 2D:
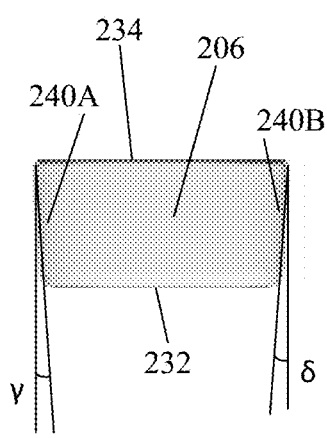
FIG. 2D shows a top plan view of the trim plate of the example video doorbell device.

The first side wall 240A of the trim plate 206, and thus the corresponding inner surface 242 of the first side wall 240A, may extend inwardly towards the aperture 244 at an angle from or adjacent the rear edge 234 to or adjacent the front edge 232. For example, as shown in FIG. 2D, the first side wall 240A may extend inwardly from or adjacent the rear edge 234 to or adjacent the front edge 232 at an angle $\gamma$ to the horizontal. For example, the angle $\gamma$ can be an acute angle. For example, the angle $\gamma$ can be in the range of substantially 1 degrees to substantially 45 degrees. For example the angle γ can be substantially 5 degrees.

The second side wall 240B of the trim plate 206, and thus the corresponding inner surface 242 of the second side wall 240B, may extend inwardly towards the aperture 244 at an angle from or adjacent the rear edge 234 to or adjacent the front edge 232. For example, as shown in FIG. 2D, the second side wall 240B may extend inwardly from or adjacent the rear edge 234 to or adjacent the front edge 232 at an angle δ to the horizontal. For example, the angle δ can be an acute angle. For example, the angle δ can be in the range of substantially 1 degrees to substantially 45 degrees. For example the angle δ can be substantially 5 degrees.

The trim plate 206 may be optionally excluded. For example, the top wall 212, bottom wall 214, and one or more side walls 216 of the housing 202 may include the elements of the trim plate 206, including the electromagnetically reflective inner surface. The top wall 212, bottom wall 214, and one or more side walls 216 may include the corresponding angles of the top wall 236, bottom wall 238, first side wall 240A and second side wall 240B of the trim plate 206.

Figure 3A:
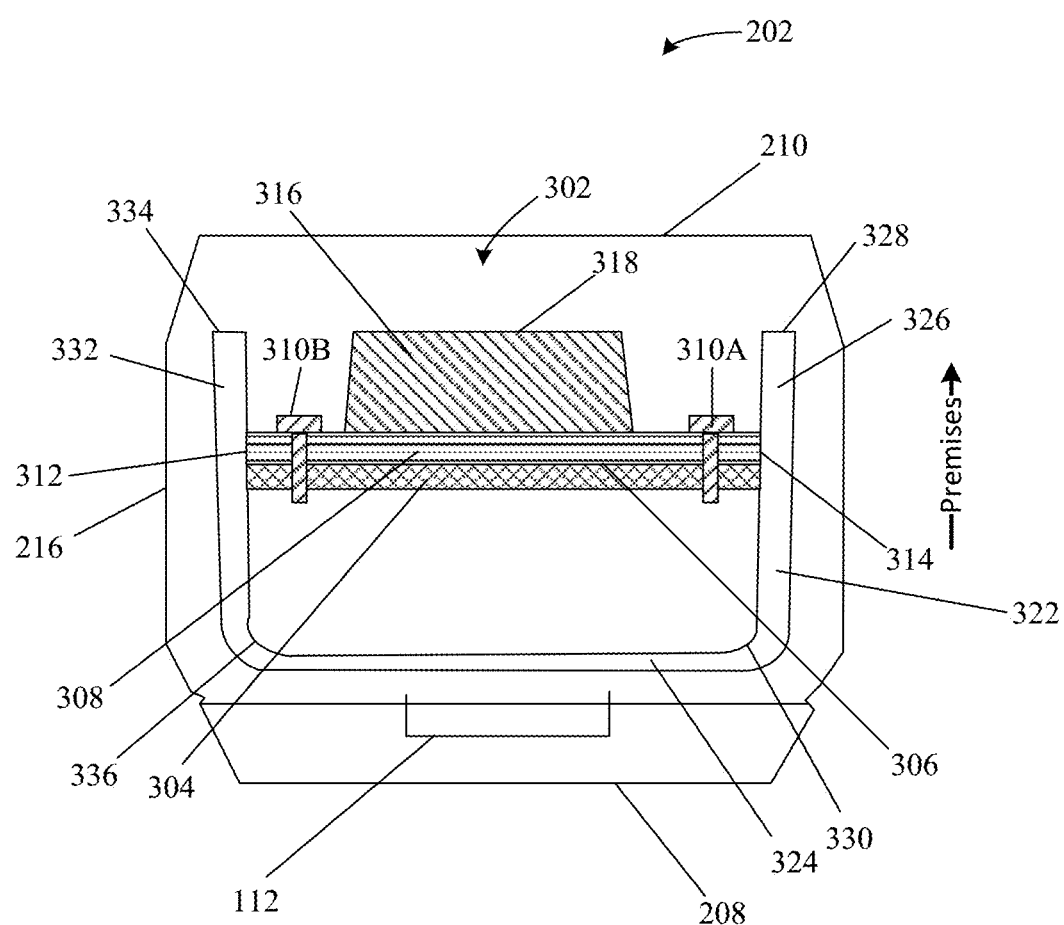
FIG. 3A shows a partial cross-sectional view of the example video doorbell device.
Figure 3B:
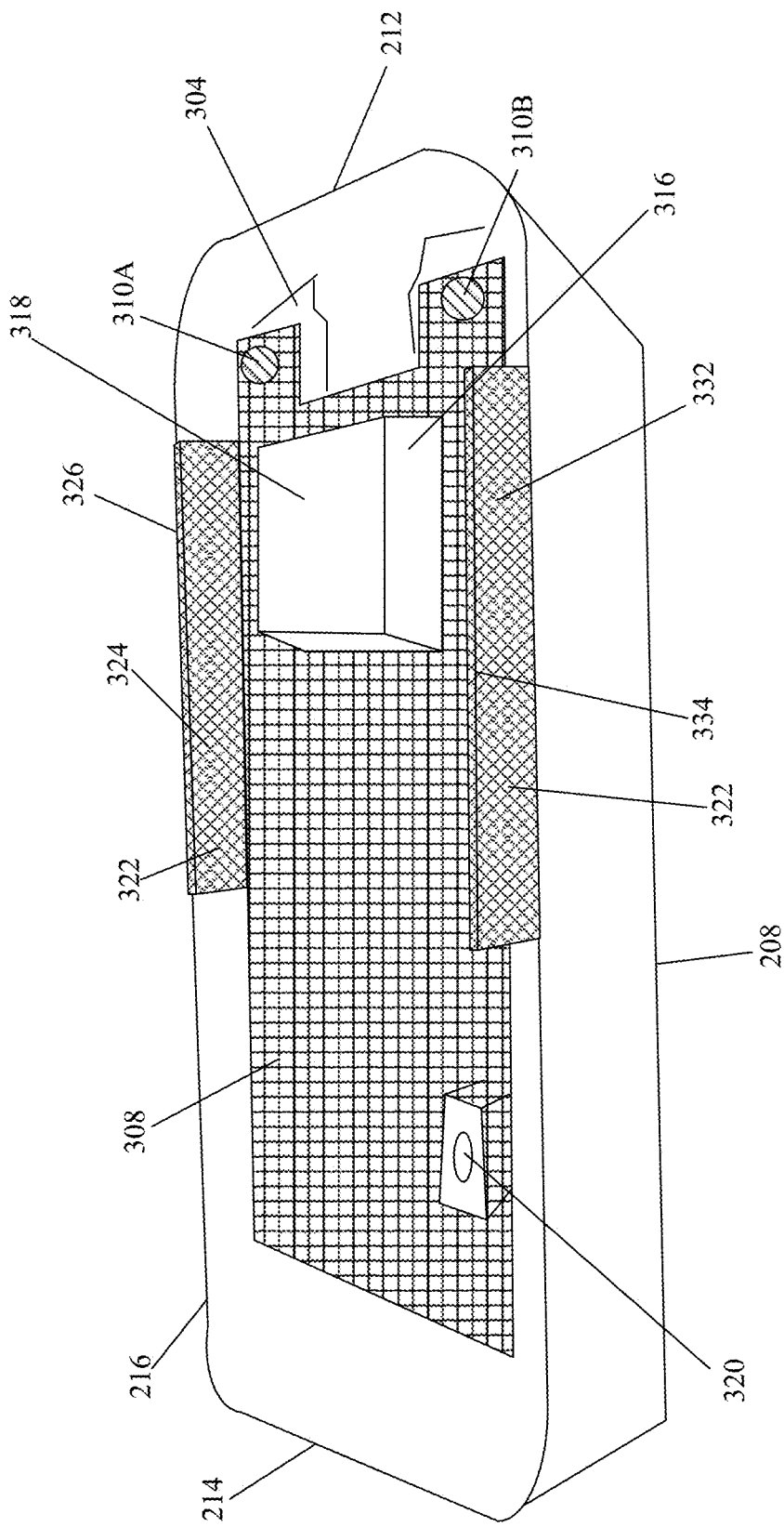
FIG. 3B shows a partial rear perspective view of an interior of the example video doorbell device.

FIGS. 3A-B show various internal views of the housing 202 for the device 100. The front wall 208, rear wall 210, top wall 212, bottom wall 214, and one or more side walls 216 may define an interior cavity 302 within the housing 202. The interior cavity 302 can have any size and shape within the constraints of the walls 208-216 of the housing 202.

The housing 202 may include a mounting platform 304. The mounting platform 304 may be positioned within the cavity 302. The mounting platform 304 may be made of any material. For example, the mounting platform 304 may be made of a non-conductive material. The mounting platform 304 may be directly or indirectly coupled to one or more of the walls 208-216 of the housing 202. The mounting platform 304 may be planar or may include a flat or substantially flat surface 306 for coupling components the mounting platform 304.

The housing 202 may house one or more circuit boards 308. Each of the one or more circuit boards 308 may be positioned within the cavity 302 of the housing 202. One or more of the one or more circuit boards 308 may be coupled to the mounting platform 304 or another portion of the housing 102. For example, one or more of the circuit boards 308 may be coupled to the surface 306 of the mounting platform 304. For example, one or more coupling devices 310A-B may be used to couple the one or more circuit boards 308 to the surface 306 of the mounting platform 304. The one or more coupling devices 310A-B may be any one or more of a screw, a rivet, a pin, adhesive, or the like. For example, each of the one or more coupling devices 310A-B may be a screw that extends through an aperture in the one or more circuit boards 308 and the mounting member 304 to threadably couple the one or more circuit boards 308 to the mounting platform 304.

Each of the one or more circuit boards 308 may be any type of circuit board, such as a printed circuit board (PCB), a strip board, or a bread board. In examples where the one or more of the one or more circuit boards 308 is a PCB, the PCB may be any type of PCB, such as a single layer PCB, a double layer PCB, a multi-layer PCB, a high density interconnect PCB, or a high frequency PCB. The one or more circuit board 308 may have a top surface and an opposing bottom surface. The bottom surface of one or more of the one or more circuit boards 308 may abut the surface 306 of the mounting platform 304 and the top surface of the one or more circuit boards 308 may face an inner surface of one of the walls 208-216 of the housing 202. For example, the top surface of the one or more circuit boards 308 may face an inner surface of the front wall 210 of the housing 202. The one or more circuit boards 308 may be electrically coupled to a power source, such as mains power, or battery power. The one or more circuit boards 308 may be communicably coupled to the camera 112, the doorbell activator 114 the speaker/microphone 116, the motion sensor, the light source 120, an RF transmitter and/or RF receiver as well as other components of the device 100.

The one or more circuit boards 308 may include any number of components positioned on and electrically coupled to each of the one or more circuit boards 308. For example, a wireless signal transmitter, such as an antenna 316, may be positioned along a surface of one of the one or more circuit boards 308. For example, the antenna 316 may be positioned along the surface of one of the one or more circuit boards 308 and may be electrically coupled to the one of the one or more circuit boards 308. The antenna 316 may be configured to send a wireless communication signal. For example, the antenna 316 may be communicably coupled to the RF transmitter and/or RF receiver and configured to transmit content (e.g., video, still images, audio, etc.) from and/or to the device 100. The antenna 316 can have any shape. For example, the antenna 316 can be in the shape of a cube, a rectangular prism, or trapezoidal prism. The antenna 316 may include a fixed end coupled to the one of the one or more circuit boards 308 and a free end 318 or rear-facing end. The antenna 316 may be positioned within the cavity 302 of the housing 202 having a vertical and horizontal position within the cavity 302 of the housing 202. The antenna 316 may be an omni-directional antenna, a semi-directional antenna, or a directional antenna. The one or more circuit boards 308 may include a number of other known components including a universal serial bus (USB) port 320. For example, the USB port may be a micro-USB port for communicably coupling another device to the device 100.

The housing 202 may include a member 322 positioned within the cavity 302 of the housing 202. The member 322 may be a reflective member or may include a reflective coating on at least one side of the member 322. For example, the member 322 may be an electromagnetically reflective member or may include an electromagnetically reflective coating on at least one side of the member 322. The member 322 may be configured to reflect wireless communication signals. For example, the member may be configured to reflect at least a portion of the RF signals that impact a surface of the member 322.

Figure 4:
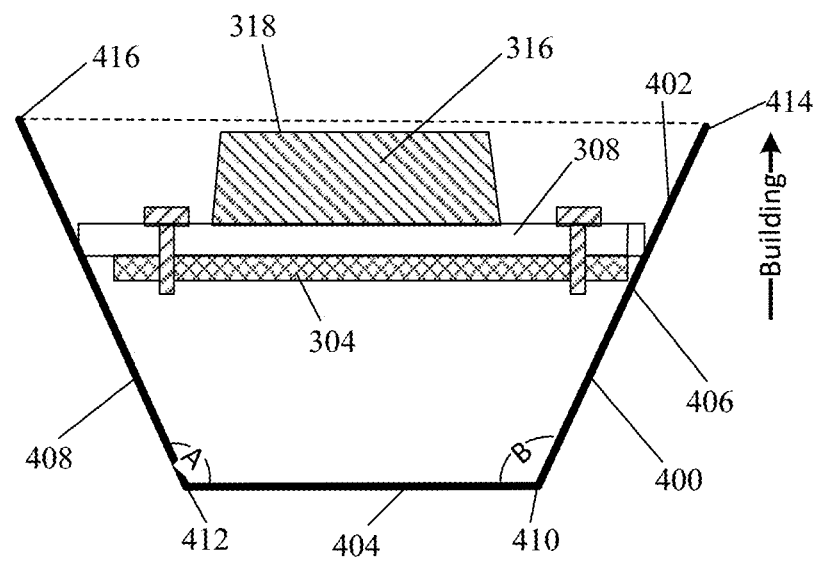
FIG. 4 shows a partial cross-sectional view of another antenna and reflective member configuration for use with the example video doorbell device.

The member 322 may have any shape and may be made of or coated with any material for reflecting RF signals. For example, the member 322 may be U-shaped or substantially U-shaped, as shown in FIGS. 3A-6. For example, the member 322 may include multiple portions. For example, each of the multiple portions may be planar, substantially planar, curved, or curvilinear. For example, FIG. 4 shows a partial cross-sectional view of another reflective member configuration for use with the device 100. The member 400 includes a first portion 404 having a first end 410 and a distal second end 412. For example, the first portion is planar and/or has a substantially flat antenna-facing surface 402. A second portion 406 may be coupled to the first end 410 of the first portion 404. The second portion 406 may be planar or substantially planar and/or may have a substantially flat antenna-facing surface 402 and may include a first free end 414. The second portion 406 may extend from the first portion 404 at an angle. For example, the angle may be a right angle or an orthogonal angle B. For example, the angle B may be in the range of substantially 95 degrees to substantially 120 degrees. A third portion 408 may be coupled to the second end 412 of the first portion 404. The third portion 408 may be planar or substantially planar and/or may have a substantially flat antenna-facing surface 402 and may include a second free end 416. The third portion 408 may extend from the first portion 404 at an angle. For example, the angle may be a right angle or an orthogonal angle A. For example, the angle A may be in the range of substantially 95 degrees to substantially 120 degrees. The member 400 may include a reflective coating or surface 402 along at least the antenna-facing side of the member 400. At least a portion of the member 400 may be positioned between the antenna 316 and the front wall 208 of the housing 202. At least another portion of the member 400 (e.g., at or adjacent the first free end 414) may be positioned between the antenna 316 and a first side wall 216 of the housing 202. At least another portion of the member 400 (e.g., at or adjacent the second free end 416) may be positioned between the antenna 316 and a second side wall 216 of the housing 202. For example, the antenna 316 may be surrounded on three sides of the antenna 316 by the member 400. The member 400 may extend within the cavity 302 from a first vertical position in the housing 202 to a second vertical position in the housing 202 and all or at least a portion of the antenna 316 may be positioned between the first vertical position and the second vertical position within the cavity 302 of the housing 202. For example, all or at least a portion of the antenna 316 may be positioned between the first free end 414 and the second free end 416 of the member 600. For example, each of the first free end 414 and the second free end 416 may extend towards the rear wall 210 of the housing farther than the free end 318 or rear facing end of the antenna 316 (e.g., as shown by the dashed line) to surround the antenna 316 along three sides with the member 400.

Figure 5:
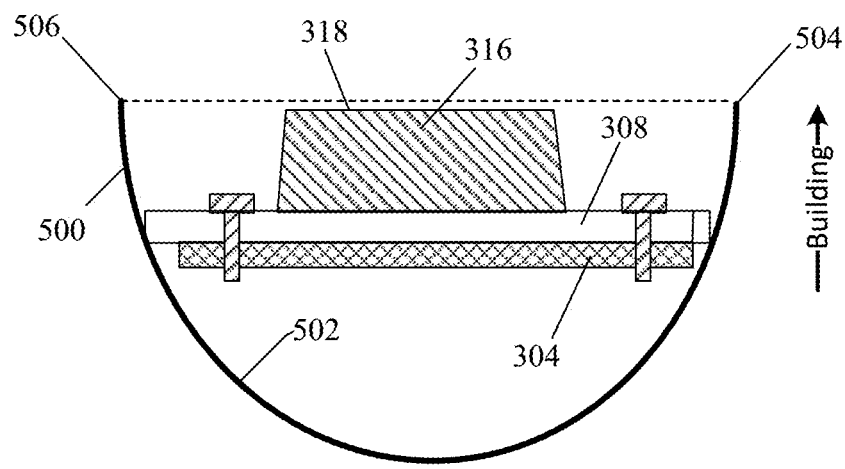
FIG. 5 shows a partial cross-sectional view of another antenna and reflective member configuration for use with the example video doorbell device.

For example, the member 322 may be a continuous curve with the same or different radius of curvature from a first free end to a distal second free end. For example, FIG. 5 shows a partial cross-sectional view of another reflective member configuration for use with the device 100. The member 500 includes a first free end 504 and a distal second free end 506. The member 500 includes a reflective coating or surface 500 along at least the antenna-facing side of the member 500. The member 500 may be a continuous curve from the first free end 504 to the second free end 506. The radius of curvature along the antenna-facing surface 502 may be variable or constant. For example, the radius of curvature may be constant and the member 500 may be in the shape of a hemisphere. At least a portion of the member 500 may be positioned between the antenna 316 and the front wall 208 of the housing 202. At least another portion of the member 500 (e.g., at or adjacent the first free end 504) may be positioned between the antenna 316 and a first side wall 216 of the housing 202. At least another portion of the member 500 (e.g., at or adjacent the second free end 506) may be positioned between the antenna 316 and a second side wall 216 of the housing 202. For example, the antenna 316 may be surrounded on three sides of the antenna 316 by the member 500. The member 500 may extend within the cavity 302 from a first vertical position in the housing 202 to a second vertical position in the housing 202 and all or at least a portion of the antenna 316 may be positioned between the first vertical position and the second vertical position within the cavity 302 of the housing 202. For example, all or at least a portion of the antenna 316 may be positioned between the first free end 504 and the second free end 506 of the member 500. For example, each of the first free end 504 and the second free end 506 may extend towards the rear wall 210 of the housing farther than the free end 318 or rear facing end of the antenna 316 (e.g., as shown by the dashed line) to surround the antenna 316 along three sides with the member 500.

Figure 6:
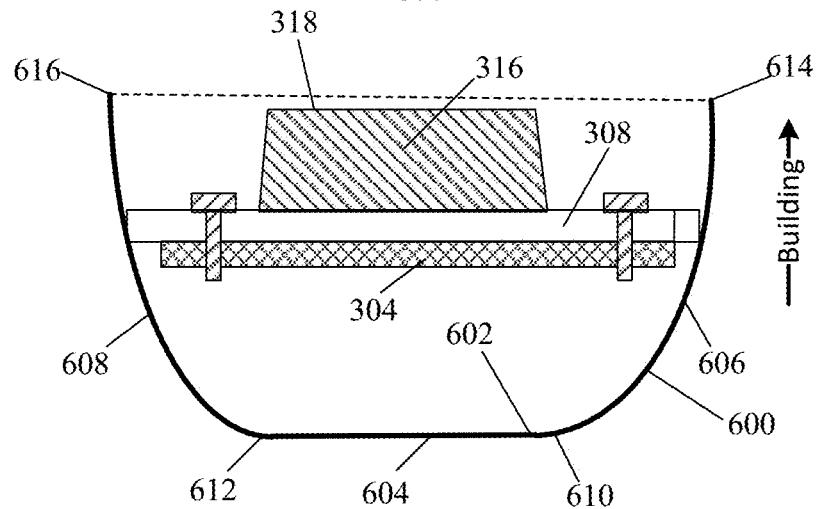
FIG. 6 shows a partial cross-sectional view of another antenna and reflective member configuration for use with the example video doorbell device.

For example, the member 322 may be bowl-shaped. For example, FIG. 6 shows a partial cross-sectional view of another reflective member configuration for use with the device 100. The member 600 includes a first portion 604 having a first end 610 and a distal second end 612. For example, the first portion is planar and/or has a substantially flat antenna-facing surface 602. A second portion 606 may be coupled to the first end 610 of the first portion 604. The second portion 606 may be curved or curvilinear and may include a first free end 614. A third portion 608 may be coupled to the second end 612 of the first portion 604 and may be curved or curvilinear and may include a second free end 616. The member 600 may include a reflective coating or surface 602 along at least the antenna-facing side of the member 600. The radius of curvature along the antenna-facing surface 502 of the second portion 606 and the third portion 608 of the member 600 may be variable or constant. For example, the radius of curvature may be variable and may increase from the end of the second portion 606 and third portion 608 coupled to the first portion 604 towards the respective free ends 614, 616. At least a portion of the member 600 may be positioned between the antenna 316 and the front wall 208 of the housing 202. At least another portion of the member 600 (e.g., at or adjacent the first free end 614) may be positioned between the antenna 316 and a first side wall 216 of the housing 202. At least another portion of the member 600 (e.g., at or adjacent the second free end 616) may be positioned between the antenna 316 and a second side wall 216 of the housing 202. For example, the antenna 316 may be surrounded on three sides of the antenna 316 by the member 600. The member 600 may extend within the cavity 302 from a first vertical position in the housing 202 to a second vertical position in the housing 202 and all or at least a portion of the antenna 316 may be positioned between the first vertical position and the second vertical position within the cavity 302 of the housing 202. For example, all or at least a portion of the antenna 316 may be positioned between the first free end 614 and the second free end 616 of the member 600. For example, each of the first free end 614 and the second free end 616 may extend towards the rear wall 210 of the housing farther than the free end 318 or rear facing end of the antenna 316 (e.g., as shown by the dashed line) to surround the antenna 316 along three sides with the member 600.

Returning to FIGS. 3A-B, the member 322 may be made of or coated with a material that has a high dielectric constant. For example, the member 322 made be made of or coated with a ceramic, glass, or a metallic material. At least a portion of the member 322 may be positioned between the antenna 316 and the front wall 208 of the housing 202. At least another portion of the member 322 may be positioned between the antenna 316 and a first side wall 216 of the housing 202. At least another portion of the member 322 may be positioned between the antenna 316 and a second side wall 216 of the housing 202. For example, the antenna 316 may be surrounded on three sides of the antenna 316 by the member 322.

The member 322 may be constructed from one or multiple pieces of material. For example, the member 322 may include at least one straight portion and at least one curved portion. For example the member 322 may include a first portion 324. The first portion 324 may include a first end and a distal second end. The first portion 324 may extend vertically within the cavity 302 and may extend laterally within the cavity 302 adjacent to the front wall 208 of the housing 202. The first portion 324 may be planar or curved.

The member 322 may include a second portion 326. The second portion 326 may be directly or indirectly coupled to the first end of the first portion 324 of the member 322. For example, the second portion 326 may include a first end and a distal free end 328. The first end of the second portion 326 may be coupled to the first end of the first portion 324 by a first curved portion 330 that may include a curved or radiused inner surface. For example, the first end of the second portion 326 may be directly coupled to the first end of the first portion 324. The second portion 326 may extend out from the first portion 324 at an angle. For example, the angle may be a right angle or substantially a right angle, as shown in FIG. 3A. For example, the angle may be an obtuse angle, as shown in FIG. 4. The second portion 326 may extend vertically within the cavity 302 and may extend generally front-to-back within the cavity 302 adjacent to the first side wall 216 of the housing 202. The second portion 326 may be planar or curved.

The member 322 may include a third portion 332. The third portion 332 may be directly or indirectly coupled to the second end of the first portion 324 of the member 322. For example, the third portion 332 may include a first end and a distal free end 334. The first end of the third portion 332 may be coupled to the second end of the first portion 324 by a second curved portion 336 that may include a curved or radiused inner surface. For example, the first end of the third portion 332 may be directly coupled to the second end of the first portion 324. The third portion 332 may extend out from the first portion 324 at an angle. For example, the angle may be a right angle or substantially a right angle as shown in FIG. 3A. For example, the angle may be an obtuse angle as shown in FIG. 4. The third portion 332 may extend vertically within the cavity 302 and may extend generally front-to-back within the cavity 302 adjacent to the second side wall 216 of the housing 202 opposite the first side wall 216. For example, the third portion may extend along a plane that is parallel or substantially parallel to the plane the second portion 326 extends along. The third portion 332 may be planar or curved.

For example, the first portion 324, second portion 326, and third portion 322 may be planer or have flat or substantially flat inner surfaces. For example, the first portion 324 may be planer or have a flat or substantially flat inner surface and the second portion 326 and the third portion 332 may be curved or have a curved inner surface.

The member 322 may be coupled to one or more of the walls 208-216 of the housing. The member 322 may also comprise or be a heat sink. The member 322 may be thermally coupled to one or more of the one or more circuit boards 308. Thermal energy (i.e., heat) may be passed from the one or more circuit boards 308 to the member 322. For example, one or more of the circuit boards 308 may include a first lateral edge 312 and a second lateral edge 314. One or both of the first lateral edge 312 and the second lateral edge 314 may be thermally coupled to the member 322. For example, the first lateral edge 312 may physically contact and be thermally coupled to the member 322, such as the third portion 332 or any other portion of the member 322. For example, the second lateral edge 314 may physically contact and bet thermally coupled to the member 322, such as the second portion 326 or any other portion of the member 322.

Figure 7A:
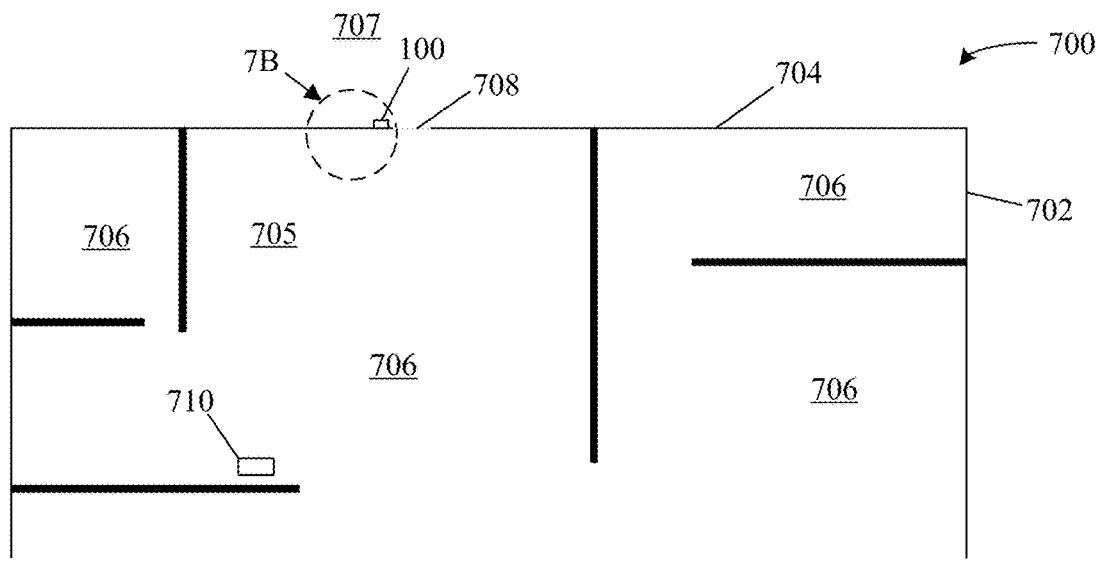
FIG. 7A shows a system environment for use of the example video doorbell device and FIG. 7B shows a portion of FIG. 7A, including the example video doorbell device, in magnified form.
Figure 7B:
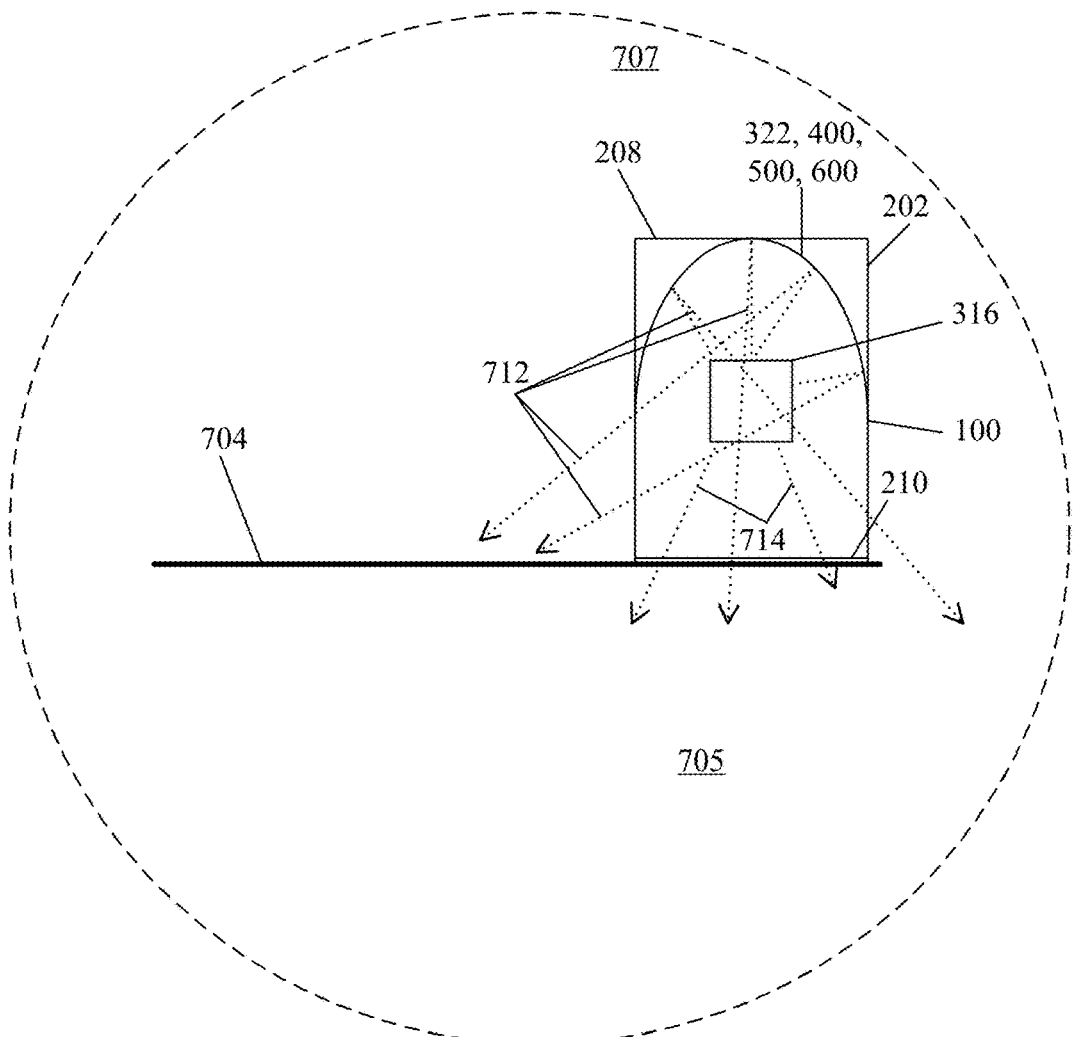

FIGS. 7A and 7B show a system environment 700 for use of the example device 100. For example, the device 100 may be mounted to a mountable surface. For example, the mountable surface may be a wall 704 positioned adjacent to a doorway 708 of a premises 702, such as a house, building, townhouse, condo, apartment, or another structure. The premises 702 may include an interior 705 with one or more rooms 706.

The system 700 may also include, or there may be provided within the interior 705 of the premises 702, a data receiving device, such as an access point 710 (e.g., a wireless access point). The access point 710 may be located in one of the rooms 706 of the interior 705 of the premises 702. For example, the access point 710 may be positioned behind the front wall 208 of the housing 202 of the device 100. The access point 710 may be configured to enable one or more wireless networks, such as WiFi networks, in at least a portion of the premises 702. The access point 710 may be configured to provide access to a network to devices configured with a compatible wireless radio, such as the device 100 or other computing devices (e.g., laptops, sensor devices, security devices (e.g., cameras)). The access point 710 may provide a user managed network (e.g., local area network), a service provider managed network (e.g., public network for users of the service provider), and/or the like.

The device 100 may be wirelessly coupled to the access point 710 and configured to send data, such as video and/or audio data (e.g., content) received via the camera 112 and/or audio data (e.g., content) received via the microphone 116, to another device, such as a system storage or processing device, or a user device (e.g., a mobile computing device, laptop computer, desktop computer, or other computing device) via the access point 710. The device 100 may also be configured to receive audio content from a user device via the access point 710, which may be output via the speaker 116 at the device 100.

Figure 7C:
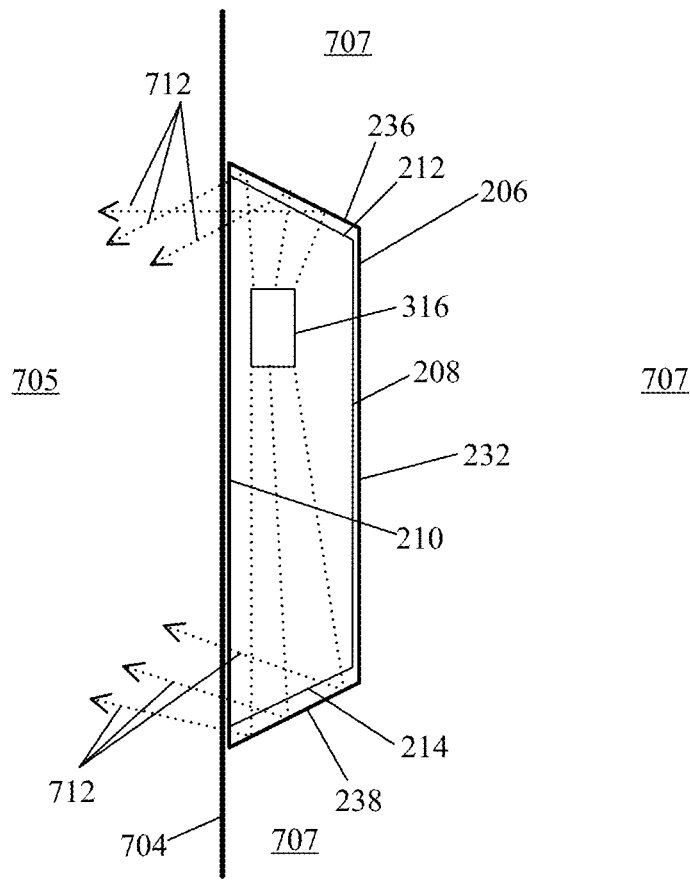
FIGS. 7C and 7D show partial cross-sectional views of the reflective capability of the trim plate of the video doorbell device.
Figure 7D:
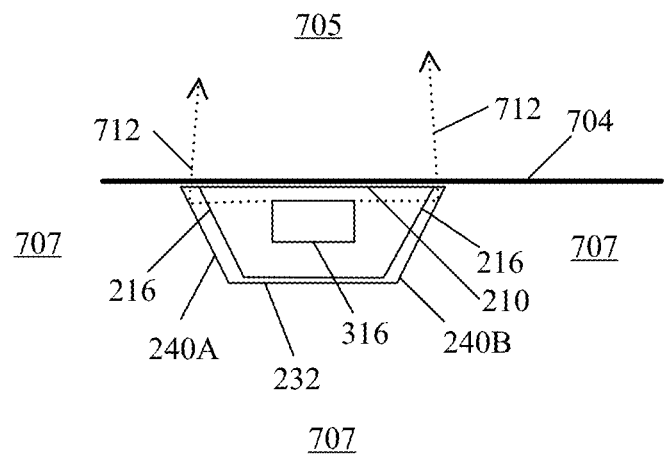

As best seen in FIGS. 7B-7D, the antenna 316 of the device 100 may be configured to send out wireless signals (e.g., RF signals 712, 714) containing content and/or data in multiple directions. For example, the RF signals 712, 714 may proceed out from the antenna 316. For example, a portion of the RF signals 714 may be sent out from the antenna 316 in a direction towards the interior 705 of the premises 702 and/or towards the access point 710 (see FIG. 7B). This portion of the RF signals 714 may have a higher likelihood of being received by the access point 710. For example, another portion of the RF signals 712 may be sent out from the antenna 316 in a direction away from, or exterior 707 to, the premises 702. For example, the portion of the RF signals 712 being sent in the direction exterior 707 to the premises 702 may be sent out from the antenna 316 towards the front wall 208 (see FIG. 7B); top wall 212 and/or bottom wall 214 (see FIG. 7C), and/or one or more side walls 216 (see FIG. 7D) of the housing 202.

As best seen in FIG. 7B, all or at least a portion of the wireless signals (e.g., RF signals 712) sent out from the antenna 316 towards the exterior 707 of the premises 702, such as from the antennal 316 towards the front wall 208 and one or more side walls 216 of the housing 202, may impact the interior-facing (e.g., facing the interior 705) surface of the reflective member 322, 400, 500, 600 and may be reflected back towards the rear wall 210 of the housing, the interior 705 of the premises 702, and/or toward the access point 710. The reflective member 322, 400, 500, 600 may have any shape, including, but not limited to, U-shaped, substantially U-shaped, or another functionally suitable shape for redirecting wireless signals (e.g., RF signals 712)

originally directed by the antenna 316 exterior the premises 702, in another direction (e.g., towards the interior 705 of the premises and/or toward the access point 710). The reflective member 322, 400, 500, 600 may include a material or coating suitable for reflecting at least a portion of the wireless signals sent by the antenna. For example, at least a portion of the reflective member 322, 400, 500, 600 may be positioned between the antenna 316 and the front wall 208 of the housing 202 to reflect the wireless signals (e.g., RF signals 712) originally directed by the antenna 316 towards the front wall 208 and exterior 707 the premises 702 in a direction towards the interior of the premises 702 and/or towards the access point 710. For example, at least a portion of at least the portion of the reflective member 322, 400, 500, 600 may have a planar or substantially planar interior-facing surface to direct the wireless signals (e.g., RF signals 712 originally sent in the direction towards the front wall 208 of the housing 202 in the direction towards the rear wall 210 of the housing 202, the interior 705 of the premises 702, and/or towards the access point 710. For example, at least a second portion of the reflective member 322, 400, 500, 600 may be positioned between the antenna 316 and a first side wall 216 of the housing 202 to reflect the wireless signals (e.g., RF signals 712) originally directed by the antenna 316 towards the first side wall 216 and exterior 707 the premises 702 in a direction towards the interior of the premises 702 and/or towards the access point 710. For example, at least a third portion of the reflective member 322, 400, 500, 600 may be positioned between the antenna 316 and a second side wall 216 of the housing 202 to reflect the wireless signals (e.g., RF signals 712) originally directed by the antenna 316 towards the second side wall 216 and exterior 707 the premises 702 in a direction towards the interior of the premises 702 and/or towards the access point 710. For example, the reflective member 322, 400, 500, 600 may include a first free end and a second free end. The first free end may be positioned between the antenna 316 and the first side 216 of the housing 202 and the second free end may be positioned between the antenna 316 and a second side 216 of the housing 202.

The device 100 may also include the trim plate 206 as described hereinabove. The use of a trim plate 206 with a reflective inner surface may provide additional wireless signal reflection capability for the device 100. For example, as best seen in FIG. 7C, all or at least a portion of the RF signals 712 sent out from the antenna 316 towards the top wall 212 and/or exterior 707 may impact the inner-facing (e.g., facing the interior 705) surface of the top wall 236 of the trim plate 206 and may be reflected back towards the rear wall 210 of the housing, the interior 705 of the premises 702, and/or toward the access point 710. The inner surface of the top wall 236 of the trim plate 206 may have any shape suitable for redirecting wireless signals (e.g., RF signals 712) originally directed by the antenna 316 exterior the premises 702, in another direction (e.g., towards the interior 705 of the premises and/or toward the access point 710). For example, due to the downward angle of the top wall 236 of the trim plate 206, all or at least a portion of these RF signals 712 may be reflected back towards the rear wall 210, the interior 705 of the premises 702, and/or towards the access point 710. The reflective inner surface of the top wall 236 of the trim plate 206 may include a material or coating suitable for reflecting at least a portion of the wireless signals sent by the antenna 316.

For example, all or at least a portion of the RF signals 712 sent out from the antenna 316 towards the bottom wall 214 and/or exterior 707 may impact the inner-facing (e.g., facing the interior 705) surface of the bottom wall 238 of the trim plate 206 and may be reflected back towards the rear wall 210 of the housing, the interior 705 of the premises 702, and/or toward the access point 710. The inner surface of the bottom wall 238 of the trim plate 206 may have any shape suitable for redirecting wireless signals (e.g., RF signals 712) originally directed by the antenna 316 exterior the premises 702, in another direction (e.g., towards the interior 705 of the premises and/or toward the access point 710). For example, due to the upward angle of the bottom wall 238 of the trim plate 206, all or at least a portion of these RF signals 712 may be reflected back towards the rear wall 210, the interior 705 of the premises 702, and/or towards the access point 710. The reflective inner surface of the bottom wall 238 of the trim plate 206 may include a material or coating suitable for reflecting at least a portion of the wireless signals sent by the antenna 316.

For example, as best seen in FIG. 7D, all or at least a portion of the RF signals 712 sent out from the antenna 316 towards the first side wall 216 and/or exterior 707 may impact the inner-facing (e.g., facing the interior 705) surface of the first side wall 240A of the trim plate 206 and may be reflected back towards the rear wall 210 of the housing, the interior 705 of the premises 702, and/or toward the access point 710. The inner surface of the first side wall 240A of the trim plate 206 may have any shape suitable for redirecting wireless signals (e.g., RF signals 712) originally directed by the antenna 316 exterior the premises 702, in another direction (e.g., towards the interior 705 of the premises 702 and/or toward the access point 710). For example, due to the inward angle of the first side wall 240A of the trim plate 206, all or at least a portion of these RF signals 712 may be reflected back towards the rear wall 210, the interior 705 of the premises 702, and/or towards the access point 710. The reflective inner surface of the first side wall 240A of the trim plate 206 may include a material or coating suitable for reflecting at least a portion of the wireless signals sent by the antenna 316.

For example, all or at least a portion of the RF signals 712 sent out from the antenna 316 towards the second side wall 216 and/or exterior 707 may impact the inner-facing (e.g., facing the interior 705) surface of the second side wall 240B of the trim plate 206 and may be reflected back towards the rear wall 210 of the housing, the interior 705 of the premises 702, and/or toward the access point 710. The inner surface of the second side wall 240B of the trim plate 206 may have any shape suitable for redirecting wireless signals (e.g., RF signals 712) originally directed by the antenna 316 exterior the premises 702, in another direction (e.g., towards the interior 705 of the premises 702 and/or toward the access point 710). For example, due to the inward angle of the second side wall 240B of the trim plate 206, all or at least a portion of these RF signals 712 may be reflected back towards the rear wall 210, the interior 705 of the premises 702, and/or towards the access point 710. The reflective inner surface of the second side wall 240B of the trim plate 206 may include a material or coating suitable for reflecting at least a portion of the wireless signals sent by the antenna 316.

The result of including the reflective member 322, 400, 500, 600, shaped and positioned within the housing 202 of the device 100, for example, as described herein, may result in a greater percentage of the RF signals sent by the antenna 316 being directed towards the rear wall 210, the interior 705 of the premises 702, and/or the access point 710 positioned within the interior 705. Similarly, the result of including a reflective trim plate 206, shaped and positioned about a portion of the housing 202 of the device 100, for example, as described herein, may result in a further greater percentage of the RF signals sent by the antenna 316 being directed towards the rear wall 210, the interior 705 of the premises 702, and/or the access point 710 positioned within the interior 705.

Figure 8:
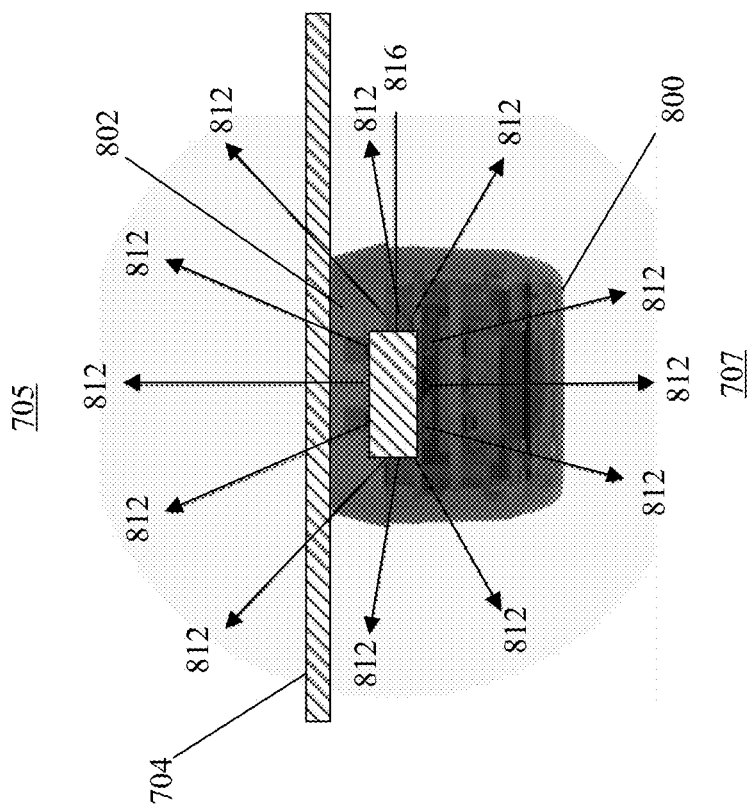
FIG. 8 shows a view of a radio frequency signal dispersion for a conventional video doorbell device without reflective members.

For example, FIG. 8 shows an example of a doorbell device 800, that includes a housing 802 and a wireless signal transmitter (e.g., an antenna 816) positioned within the housing 802. The doorbell device 800 is coupled to an exterior wall 704 of a premises (e.g., premises 702). The antenna 816 sends wireless signals (e.g., RF signals 812 in all directions, including towards the interior 705 of the premises 702 and exterior 707 the premises 702. There is a lower likelihood that the RF signal 812 directed exterior 707 the premises 702 would be received by a data receiving device (e.g., an access point) positioned within the interior of the premises 702.

Figure 9:
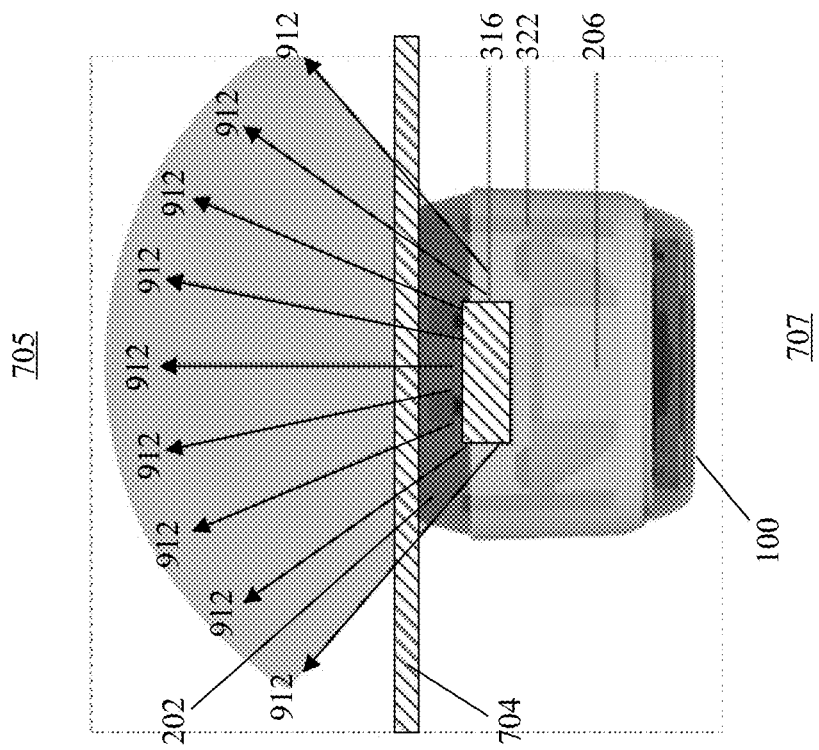
FIG. 9 shows a view of radio frequency signal dispersion for a video doorbell device with a reflective member.

FIG. 9 shows the example doorbell device 100, including a housing 202, the antenna 316 positioned within the housing 202, the reflective member 322 positioned within the housing 202, and the reflective trim plate 206 positioned about at least a portion of the housing 202. The doorbell device 100 is coupled to an exterior wall 704 of the premises (e.g., premises 702). As can be in FIG. 9, as the antenna 316 sends the wireless signals (e.g., RF signals 912), at least a portion of the RF signals 912 that were sent by the antenna 316 in the direction exterior the premises 702 are reflected back by at least one of the reflective member 322 or the trim plate 206 towards the interior 705 of the premises 702, and an access point 710 that may be positioned within the interior 705 of the premises. The result is that a greater portion of the RF signals 912 of the device 100 are ultimately directed towards the interior of the premises 702 and/or the access point 710 than for the RF signals 812 of the device 800 without a reflective member 322, 400, 500, 600, and/or a reflective trim plate 206.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. An apparatus comprising:
   a doorbell housing having a front surface facing exterior of a premises and a rear surface facing an interior of the premises;
   a camera disposed inside the doorbell housing;
   an antenna positioned within the doorbell housing and configured to send a wireless signal, comprising video data from the camera, to a data receiving device inside the premises; and
   a reflective member positioned within the doorbell housing and configured to reflect at least a portion of the wireless signal that is sent toward the front surface of the doorbell housing.

2. The apparatus of claim 1, wherein at least a portion of the reflective member is positioned between the antenna and the front surface of the doorbell housing.

3. The apparatus of claim 1, wherein the reflective member is configured to reflect the at least the portion of the wireless signal towards at least one of the rear surface of the doorbell housing or the interior of the premises.

4. The apparatus of claim 1, wherein the reflective member extends from a first vertical position in the doorbell housing to a second vertical position in the doorbell housing and wherein at least a portion of the antenna is positioned within the doorbell housing between the first vertical position and the second vertical position.

5. The apparatus of claim 1, wherein the reflective member is substantially U-shaped.

6. The apparatus of claim 1, wherein the reflective member extends around a plurality of sides of the antenna.

7. The apparatus of claim 1, wherein the reflective member comprises a substantially planar surface positioned between the antenna and the front surface of the doorbell housing.

8. The apparatus of claim 1, wherein the doorbell housing further comprises a first side wall and a second side wall, wherein a first portion of the reflective member is positioned between the antenna and the first side wall and a second portion of the reflective member is positioned between the antenna and the second side wall, and wherein at least one of the first portion or the second portion of the reflective member are configured to reflect at least a second portion of the wireless signal that is sent by the antenna.

9. The apparatus of claim 1, further comprising a trim plate coupled to the doorbell housing, wherein at least a portion of an inner surface of the trim plate is configured to reflect another portion of the wireless signal.

10. The apparatus of claim 1, further comprising a doorbell activator positioned along the front surface of the doorbell housing.

11. An apparatus comprising:
    a housing comprising a front surface and a rear surface;
    a doorbell activator positioned along the front surface of the housing;
    an antenna positioned within the housing and configured to send a wireless signal comprising data; and
    a reflective member positioned within the housing and configured to reflect at least a portion of the wireless signal that is sent toward the front surface of the housing away from the front surface of the housing.

12. The apparatus of claim 11, further comprising at least one of a camera or a microphone disposed at least partially within the housing, wherein the data comprises at least one of video data from the camera or audio data from the microphone.

13. The apparatus of claim 11, wherein at least a portion of the reflective member is positioned between the antenna and the front surface of the housing.

14. The apparatus of claim 11, wherein the reflective member extends from a first vertical position in the housing to a second vertical position in the housing and wherein the antenna is positioned within the housing between the first vertical position and the second vertical position.

15. The apparatus of claim 11, wherein the front surface is configured to face an exterior of a premises and the rear surface is configured to face an interior of the premises, and wherein the reflective member is configured to reflect the at least the portion of the wireless signal towards the interior of the premises.

16. The apparatus of claim 11, wherein the housing further comprises a first side wall, wherein a first portion of the reflective member is positioned between the antenna and the first side wall and configured to reflect at least a second portion of the wireless signal that is sent by the antenna.

17. An apparatus comprising:
a doorbell housing;
a camera positioned along an outer surface of a first side of the doorbell housing;
a doorbell activator positioned along the outer surface of the first side of the doorbell housing;
an antenna positioned within the doorbell housing and configured to send a wireless signal comprising video data from the camera; and
a reflective member positioned within the doorbell housing and extending between the antenna and the first side of the doorbell housing, wherein the reflective member is configured to reflect at least a portion of the wireless signal sent by the antenna toward the first side of the doorbell housing.

18. The apparatus of claim 17, wherein the reflective member extends from a first vertical position in the doorbell housing to a second vertical position in the doorbell housing and wherein at least a portion of the antenna is positioned within the doorbell housing between the first vertical position and the second vertical position.

19. The apparatus of claim 17, wherein the reflective member comprises a substantially planar portion positioned between the antenna and the first side of the doorbell housing.

20. The apparatus of claim 17, wherein a front surface of the doorbell housing is configured to face exterior of a premises and a rear surface of the doorbell housing is configured to face interior of the premises, and wherein the reflective member is configured to reflect the at least the portion of the wireless signal towards the interior of the premises.

21. The apparatus of claim 17, wherein the reflective member further comprises a first portion extending between the antenna and a first side wall of the doorbell housing and a second portion extending between the antenna and a second side wall of the doorbell housing, wherein at least one of the first portion or the second portion is configured to reflect at least another portion of the wireless signal sent toward the first side wall or the second side wall of the doorbell housing.

* * * * *